(12) United States Patent
Leidecker et al.

(10) Patent No.: US 10,570,973 B2
(45) Date of Patent: Feb. 25, 2020

(54) PISTON HAVING A MULTI-PART CONSTRUCTION FOR A BRAKE CALIPER OF A DISK BRAKE

(71) Applicants: Continental Teves AG & Co., oHG, Frankfurt (DE); Erdrich Umformtechnik GmbH, Renchen-Ulm (DE)

(72) Inventors: Norbert Leidecker, Eschborn (DE); Norman Muth, Steinbach/Taunus (DE); Matthias Müller, Oberkirch (DE); Matthias Würz, Oberursel (DE); Uwe Zeibig, Achern (DE)

(73) Assignees: Continental Teves AG & Co. oHG, Frankfurt (DE); Erdrich Umformtechnik GmbH, Renchen-Ulm (DE)

( * ) Notice: Subject to any disclaimer, the term of this patent is extended or adjusted under 35 U.S.C. 154(b) by 22 days.

(21) Appl. No.: 15/562,170

(22) PCT Filed: Mar. 15, 2016

(86) PCT No.: PCT/EP2016/055566
§ 371 (c)(1),
(2) Date: Sep. 27, 2017

(87) PCT Pub. No.: WO2016/165897
PCT Pub. Date: Oct. 20, 2016

(65) Prior Publication Data
US 2018/0080515 A1    Mar. 22, 2018

(30) Foreign Application Priority Data

Apr. 15, 2015 (DE) .......................... 10 2015 206 725
Jul. 20, 2015 (DE) .......................... 10 2015 213 579

(51) Int. Cl.
*F16D 65/18* (2006.01)
*F16J 1/00* (2006.01)
(Continued)

(52) U.S. Cl.
CPC .............. *F16D 65/18* (2013.01); *F16J 1/005* (2013.01); *F16D 2121/04* (2013.01);
(Continued)

(58) Field of Classification Search
CPC .. F16D 65/18; F16D 2123/00; F16D 2121/02; F16D 2121/04; F16J 1/005
See application file for complete search history.

(56) References Cited

U.S. PATENT DOCUMENTS 3,064,768 A    11/1962  Dotto
3,688,875 A     9/1972  De Hoff et al.
(Continued)

FOREIGN PATENT DOCUMENTS

DE         2207414 A1   10/1972
DE    102007051456 A1    4/2009
(Continued)

OTHER PUBLICATIONS

International Search Report and Written Opinion for International Application No. PCT/EP2016/055566, dated May 30, 2016, 6 pages.
(Continued)

*Primary Examiner* — Abiy Teka
(74) *Attorney, Agent, or Firm* — RatnerPrestia

(57) ABSTRACT

A thin-walled piston having a multi-part construction for a brake caliper, the piston having a one-piece design with the form of a pot, which is open on one side, a longitudinal axis, a wall and a piston floor, and which can be applied in the region of the piston floor with an axial contact surface to a brake lining, wherein a tubular insert with a cone is fixed in the interior of the piston, the insert forming a bearing for a bushing.

16 Claims, 3 Drawing Sheets

(51) Int. Cl.
*F16D 121/04* (2012.01)
*F16D 121/24* (2012.01)
*F16D 123/00* (2012.01)
*F16D 125/06* (2012.01)

(52) U.S. Cl.
CPC ...... *F16D 2121/24* (2013.01); *F16D 2123/00* (2013.01); *F16D 2125/06* (2013.01); *F16D 2200/0004* (2013.01)

(56) References Cited

U.S. PATENT DOCUMENTS

| 5,366,047 | A | * | 11/1994 | Beck | F16D 65/0006 |
|---|---|---|---|---|---|
| | | | | | 188/72.4 |
| 6,382,367 | B1 | * | 5/2002 | Varzescu | F16D 65/18 |
| | | | | | 188/72.7 |
| 8,869,677 | B2 | | 10/2014 | Koch et al. | |
| 9,568,056 | B2 | | 2/2017 | Platzer et al. | |
| 2011/0132188 | A1 | | 6/2011 | Winkler et al. | |
| 2014/0208940 | A1 | | 7/2014 | Leidecker et al. | |

FOREIGN PATENT DOCUMENTS

| DE | 102009012016 A1 | 9/2010 |
|---|---|---|
| DE | 102009038138 A1 | 12/2010 |
| DE | 102010030277 A1 | 2/2011 |
| DE | 102011080940 A1 | 6/2012 |
| DE | 102012203162 A1 | 3/2013 |

OTHER PUBLICATIONS

German Search Report for German Application No. 10 2015 213 579.9, dated Mar. 15, 2016, including partial English translation, 9 pages.

* cited by examiner

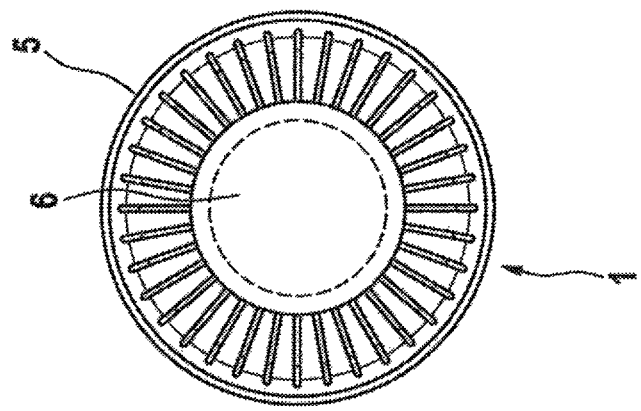
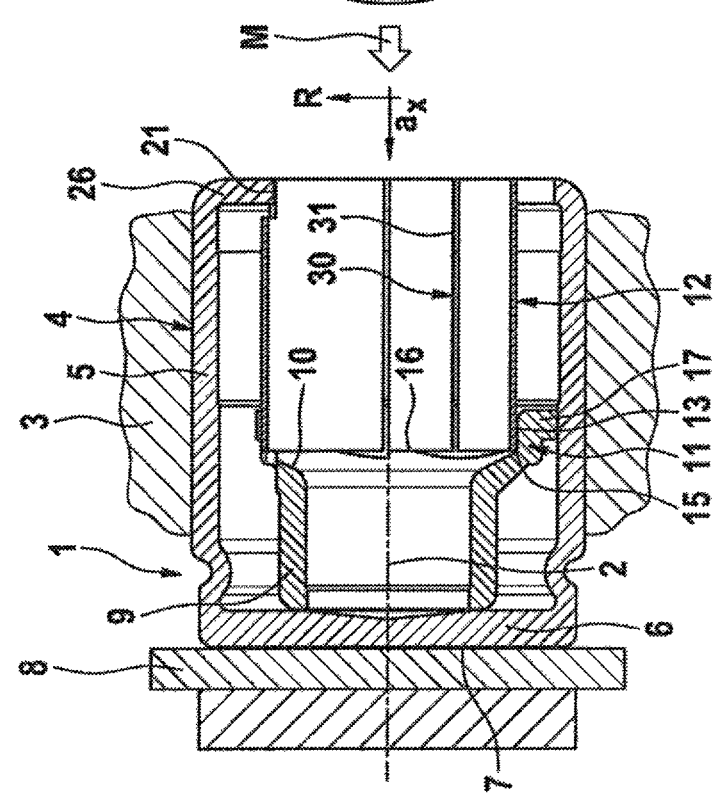
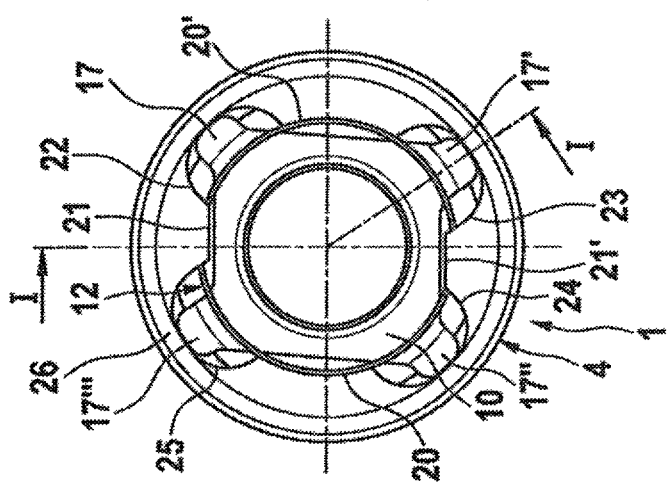

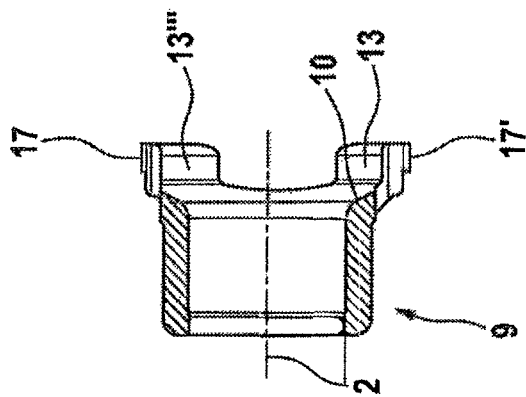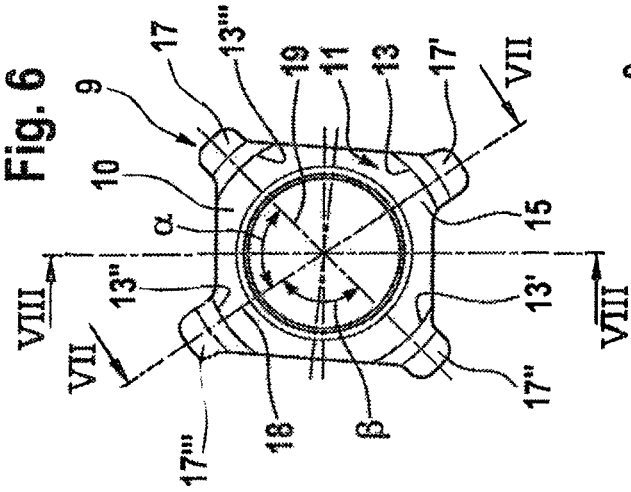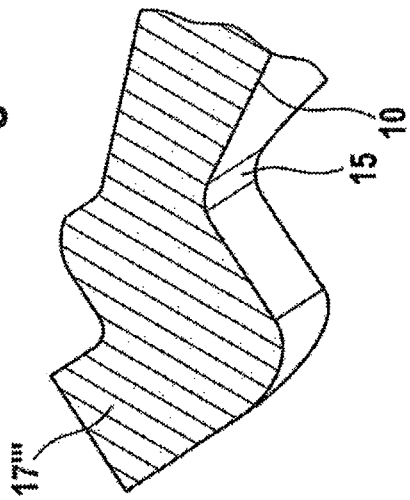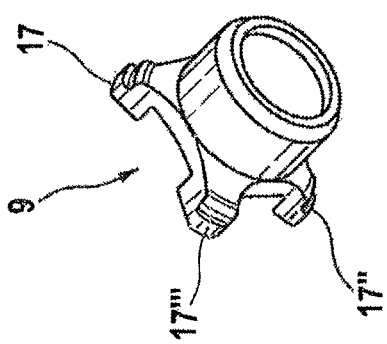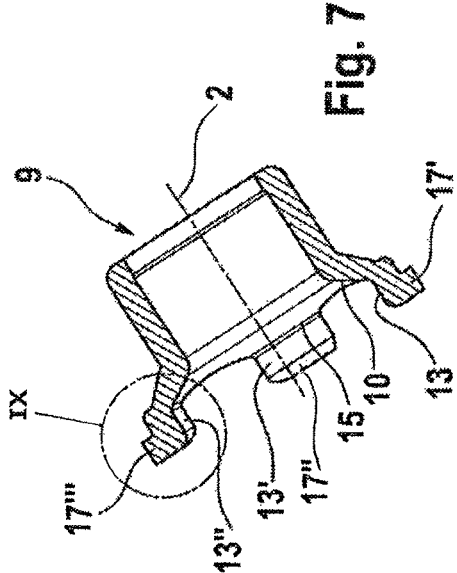

US 10,570,973 B2

PISTON HAVING A MULTI-PART CONSTRUCTION FOR A BRAKE CALIPER OF A DISK BRAKE

CROSS REFERENCE TO RELATED APPLICATIONS

This application is the U.S. National Phase Application of PCT International Application No. PCT/EP2016/055566, filed Mar. 15, 2016, which claims priority to German Patent Application No. 10 2015 206 725.4, filed Apr. 15, 2015 and 10 2015 213 579.9 Jul. 20, 2015, the contents of such applications being incorporated by reference herein.

FIELD OF THE INVENTION

The invention concerns a thin-walled piston for a brake caliper of a vehicle disk brake, which is formed in a forming process from a metallic material, in particular from a flat sheet steel, the piston having the form of an integral pot which is open on one side and has a longitudinal axis, a wall and a piston crown, and which in the region of the piston crown can be applied with an axial contact surface to a brake pad, wherein a cone surface is provided on the inner face of the piston and the cone surface is present at a thin-walled insert which is fixed in the piston.

BACKGROUND OF THE INVENTION

The piston interior delimits a hydraulic pressure chamber, i.e. determines the effective hydraulic piston surface, and at the same time defines a receiver and geometric interface for a rotation-translation converter (spindle-nut gear mechanism or preferably ball-screw drive (KGT)) of an actuator unit. DE 10 2012 203 162, which is incorporated by reference describes a generic and robust brake piston construction with a dish-like pressure piece. For twist prevention, designed reinforced for ease of maintenance, between the piston and nut, accordingly it is provided that the piston has a collar at its open end, wherein its free edge is specially profiled so as to create reinforced twist-prevention means.

SUMMARY OF THE INVENTION

An aspect of the present invention presents a further improved piston, constructed in a lightweight and stable fashion, which effectively meets the multilateral requirements of modern motor vehicle brakes with their combination of hydraulic and electric actuation, and wherein furthermore component assembly is systematically facilitated.

In an aspect of the invention the insert forms a bearing for a bush. The bush, thus mounted indirectly in the piston and preferably made of thin sheet steel material, facilitates the mounting pairing between piston and spindle-nut arrangement, in that it performs a function of an integral insertion aid which—very usefully—can be constructed identically for all piston sizes because the insert contributes to the bearing function. Consequently, according to the invention, the variety of components can be reduced and at the same time mounting of the piston assembly simplified.

In a further preferred advantageous embodiment of the invention, the insert has an integral receiver for insertion of a cylindrically shaped end portion of the bush. In this way, a particularly favorable, effective and precise centering between the compensation element and the pressure piece becomes possible, and in principle it is also possible for the bush and insert to form a piston assembly by being pre-attached to each other by force fit and fixed jointly in the piston interior.

In a further advantageous embodiment of the invention, the receiver in the insert is formed stepped such that at least one protrusion serves for axial support of an end face of the end portion. Accordingly, the protrusion automatically defines and limits the axial insertion depth between the bush and the receiver. Incorrect assembly of the formed and premounted assembly is thus automatically excluded.

In a further advantageous embodiment of the invention, on the open side of the piston, a piston collar is equipped with supports for the bush. At least two supports may preferably be formed as cylindrical edge portions of the piston collar, wherein their contour is arranged coaxially aligned to receive the bush. The collar-side end of the bush is configured such that this sits directly on the supports of the piston collar. In this way, an end-side, coaxially oriented and statically determined mounting and centering on the collar-side end of the bush become possible.

Furthermore, on its collar-side end, the bush may be provided with a special profiting. The purpose of this integrated structural measure may for example be an intelligent implementation of an automatically positionally correct mounting of the piston assembly. In other words, this may prevent the mounting sleeve from being fitted incorrectly. In another embodiment of the invention, the bush is provided with a special profiling which has at least two recesses open at the edges. This exemplary measure may serve for passage of correspondingly positionally correctly placed twist-prevention means, which in particular may be present on the piston collar. In this way, the functionally correctly integrated twist prevention between the piston and nut can be ensured.

Preferably, the bush is present as a cylindrically wound, thin sheet steel plate or chrome steel plate which may on its periphery have an axially oriented, in particular continuous, split joint. The edges of the split joint may be welded or provided with another mutual connection which increases the internal stability of the bush. For the purpose of further rationalization, in a particularly simple embodiment it is suitable if the split joint is arranged such that it lies approximately in the region of the support of the piston collar. In a simple and structural manner, this promotes the internal stability so that even particularly thin sheet steels can be used to produce the bush.

For defined radial centering, mounting and fixing between the insert and piston inner wall, several cams are arranged offset on the periphery; said cams have a defined radial length with the extension direction towards the radial outside, and under deformation may be used for fixing to the piston inner wall. A variation in the radial length of the cams here allows simple adaptation to each application with different piston diameter types. In other words, with otherwise uniform, standard main and connecting dimensions of damping element, drive nut and spindle, and mounting bush diameter etc., it is possible to obtain a favorable large-series variation with improved component assembly.

Advantageously, the bush receiver is an integral part component of each cam, so that these features are placed correspondingly on the periphery.

For mechanical stress compensation, it is provided that the cams, support and twist-prevention means are each arranged on the periphery, placed twisted at an angle relative to each other. Here, the placing of the cams on the periphery of the insert is substantially arranged such that the cams are provided so as to align with recesses, preferably in a cloverleaf pattern, in the peripheral contour of the piston collar, so as to ensure an axially oriented introduction of the insert from the open side of the piston.

For favorable filling with hydraulic pressure medium, and for accelerated purging of a piston with such a construction with piston collar, it may be particularly suitable if at least one of the recesses in the piston collar extends burr-free, i.e. substantially smoothly, viewed in the radial direction, up to the piston inner wall, so that to this extent no undesirable air bubbles can remain in the piston interior.

BRIEF DESCRIPTION OF THE DRAWINGS

Further details will arise from the description below of a preferred exemplary embodiment shown in the drawing. The drawing shows:

FIG. 1 approximately to scale, a constructed piston module in cross-section along line I-I of FIG. 2, FIG. 2 a piston module in a view from the right onto its open side, FIG. 3 a piston module in a view from the left, FIG. 4 a perspective view of the piston module in reduced scale, FIG. 5 a perspective view of an insert in reduced scale, FIG. 6 an insert viewed from the right, approximately to scale, FIG. 7 an insert in a cross section along line VII-VII of FIG. 6, FIG. 8 an insert in cross-section along line VIII-VIII of FIG. 6, FIG. 9 an enlarged extract of FIG. 7, and FIG. 10 a bush, approximately on original scale and in perspective.

DETAILED DESCRIPTION OF THE PREFERRED EMBODIMENTS

Figure 4:
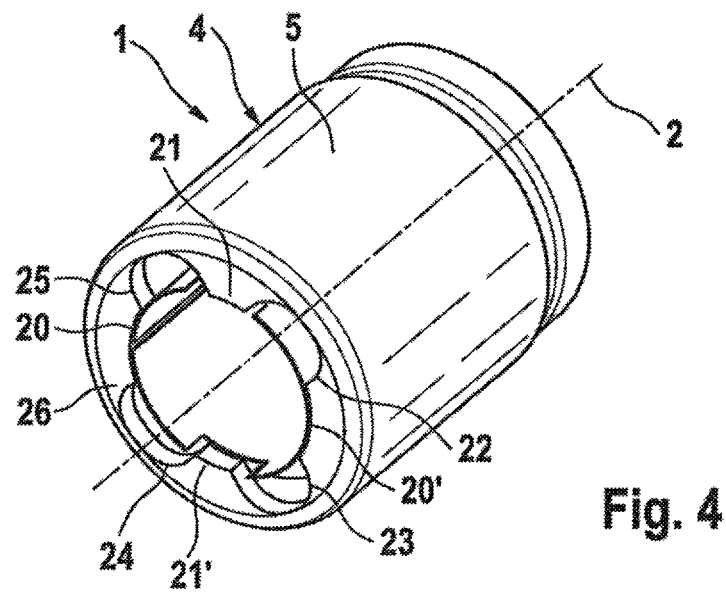
Figure 10:
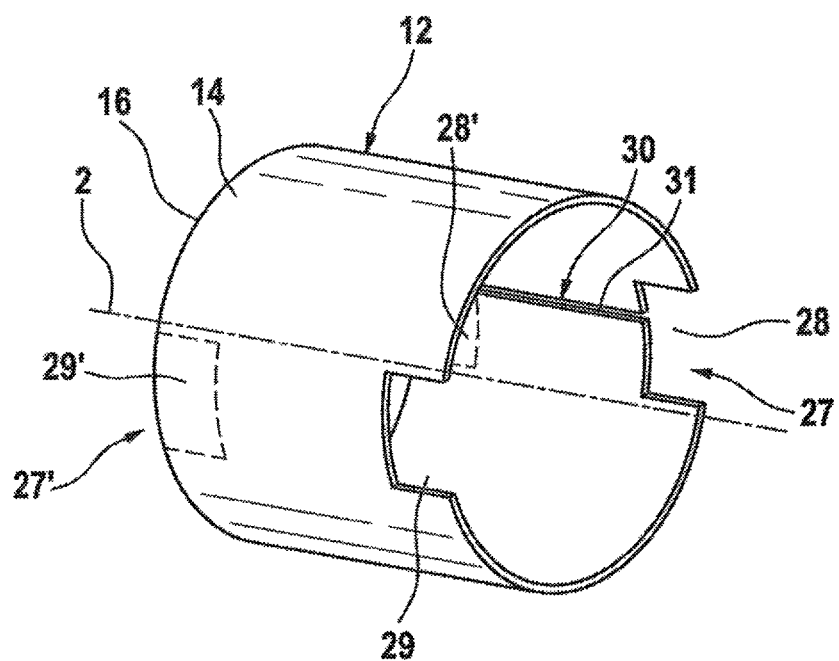

A piston 1 is arranged in a brake caliper housing 3 of a vehicle disk brake and guided axially displaceably along its longitudinal axis 2. The piston 1 is obtained by a forming process with cold hardening, material flow and displacement processes without material removal, preferably from a flat metallic sheet steel material.

A piston skirt 4 is formed integrally by a pot open on one side with an axially oriented longitudinal axis 2, with a cylindrical wall 5 and with a piston crown 6. The piston crown 6 may be placed with a contact face 7 on a brake pad 8 in the axial direction in order to load a brake disk (not shown).

For the purpose of forming an interface between the piston 1 and a rotation-translation converter in the form of a nut and spindle actuator, a cylindrical, tubular, thin-walled insert 9 is fixed in the interior of the piston skirt 4. The insert 9 forms a cone 10 which, for centered support of a nut, is formed widening hopper-like in the direction of the open side of the piston 1. According to an aspect of the invention, the insert 9 also has an integrated bearing means 11 for a cylindrical bush 12 which lines the piston interior. The bush 12 is thus mounted and centered indirectly in the piston 1 via the insert 9. Accordingly, the bush 12 serves as a tubular extension of the insert 9 in the sense of an integrated mounting aid for the actuator unit. With such a standardized interface, with simple construction using a standardized bush 12, the automated or manual insertion of the actuator in the direction of the piston interior is simplified for widely varying piston diameters. Advantageously, the insert 9 is designed by forming from a flat sheet steel material.

In a preferred variant, the insert 9 integrates a receiver 13 for an end portion 14 of the bush 12. The receiver 13 thus formed is arranged so that it overlaps an outer diameter of the bush 12 from the radial outside, i.e. spans the bush 12 in the radial direction. For easier, automatically correct insertion of the bush 12, the receiver 13 is equipped with a stop means 15. In the simplest exemplary case, the insert 9 may for example be equipped with a step or a shoulder so that the correctly placed bush 12, in particular its end face 16, automatically stops on the stop means 15.

For centering, mounting and fixing of the bush 12, in principle it is sufficient if the insert 9 has three cams 17 arranged on the periphery, which are distributed with a regular offset at an angle of 120° to each other and which have a radially defined length with the extension direction towards the radial outside, and wherein the cams 17 serve for fixing the insert 9 to the piston inner wall. The cams 17 may be cranked in an L shape in longitudinal section. In the preferred variant according to FIGS. 2 and 6, in contrast two mutually diametrically opposed cam pairs are arranged on a common axis 18, 19, wherein these axes 18, 19 intersect at unequal angles $\alpha$, $\beta$ in a diagonal cross. In each of the variants described, the receiver 13 also forms an integral part of the cam 17.

In optimize compactness, the cams 17, support 20 and twist-prevention means 21 are arranged on the periphery, placed twisted at an angle relative to each other. In addition, the distribution of the cams 17 on the periphery of the insert 9 is substantially arranged such that along the longitudinal axis 2, the cams 17 jointly align with recesses 22-25 in the piston collar 26.

At the open end of the piston 1, a piston collar 26 forms at least one direct support 20 for the bush 12. The bush 12 is extended linearly up to the support 20 so that the collar-side end of the bush 12 sits directly on the support 20 of the piston collar 26.

The collar-side end of the bush 12 may also have a special profiling 27. As an example, the collar-side end of the bush 12 has at least two cut-outs 28, 29 which provide a passage for the twist-prevention means 21 on the piston collar 26.

In principle, the bush 12 may be formed as a cylindrical, thin tubular portion open at the ends. According to the preferred variant, the bush 12 is however formed as a cylindrically bent, thin spring steel sheet which is split on the periphery, and under elastic deformation is bent cylindrically and clamped under pretension by the receiver 13 and support 20. The latter variant is particularly favorable if the split 30 of the bush 12 has a split joint 31 which is arranged in the region of a support 20 of the piston collar 26. In a further embodiment of this design, the piston collar 26 has two supports 20 which are arranged lying substantially diametrically opposite each other, and constitute edge portion contours of the piston collar 26 in the manner of ring segments, wherein these edge portion contours are arranged coaxially aligned with the receiver 13 of the bush 12.

Although in principle, in a preferred embodiment, it is sufficient for the bush 12 to be equipped with the described profiling 27 or cut-outs 28, 29 exclusively on its collar-side end, according to another embodiment the profiling 27, 27' arranged quasi-symmetrically on both sides is recommended, with supplementary cut-outs 28', 29' as follows. The symmetrical profiling 27, 27' arranged on both sides, i.e. apparently superfluously at one end, achieves the particular advantage that all bushes 12 can be freely introduced with any arbitrary end into the piston interior, resulting in both a simplified piston assembly jig with simpler component supply, and an accelerated piston assembly process.

At least one recess 22, 23, 24, 25 in the piston collar 26 extends burr-free up to the piston inner wall, in order to improve the process of filling with pressure medium.

The axially positionally correct assembly of such a particularly compactly constructed piston unit from the different individual components, based on the following temporal sequence: 1) provision of the piston skirt 4; 2) introduction of insert 9; 3) integration of bush 12, and 4) insertion of actuator unit, is greatly simplified by the structurally embedded features supporting mutual alignment, so that economic and robot-supported component assembly is possible.

LIST OF REFERENCE SIGNS

1 Piston
2 Longitudinal axis
3 Brake caliper housing
4 Piston skirt
5 Wall
6 Piston crown
7 Contact face
8 Brake pad
9 Insert
10 Cone
11 Bearing means
12 Bush
13 Receiver
14 End portion
15 Stop means
16 End face
17 Cam
18 Axis
19 Axis
20 Support
21 Twist-prevention means
22 Recess
23 Recess
24 Recess
25 Recess
26 Piston collar
27, 27' Profiling
28, 28' Cut-out
29, 29' Cut-out
30 Split
31 Split joint
Ax Axial direction
r Radial direction
M Mounting direction
α, β Angle

The invention claimed is:

1. A piston for a brake caliper of a vehicle disk brake, which is formed in a forming process from a metallic material, the piston having a form of an integral pot which is open on one side and has a longitudinal axis, a wall and a piston crown, and which in a region of the piston crown can be applied with an axial contact surface to a brake pad, wherein an insert with a cone is fixed in an interior of the piston, wherein the insert forms a bearing for a bush, wherein the insert comprises at least three cams formed at an axial end of the insert opposite the piston crown, the at least three cams separated from one another by a circumferential space, and wherein the at least three cams have an offset distribution of 120° relative to one another, and a defined radial length with extension direction towards a radial outside, such that the cams serve for fixing the insert to a piston inner wall.

2. The piston as claimed in claim 1, wherein the insert forms a receiver for an end portion of the bush.

3. The piston as claimed in claim 2, wherein the receiver has a stop for the bush.

4. The piston as claimed in claim 2, wherein the receiver is an integral part of the cams.

5. The piston as claimed in claim 1, wherein the cams are formed cranked in an L shape.

6. The piston as claimed in claim 1, wherein the cams, support and a twist-prevention means are each arranged on a periphery and placed twisted at an angle relative to each other.

7. The piston as claimed claim 6, wherein a piston collar at least partially forms a support for the bush.

8. The piston as claimed in claim 7, wherein a collar-side end of the bush sits directly on the support.

9. The piston as claimed in claim 8, wherein the collar-side end of the bush has a profiling.

10. The piston as claimed in claim 1, wherein the bush is formed as a cylindrical thin tubular portion, or as a cylindrically bent, thin spring steel sheet which is split on a periphery.

11. The piston as claimed in claim 1, wherein at least one recess in a collar of the piston collar extends burr-free up to a piston inner wall.

12. The piston as claimed in claim 1, wherein the metallic material is a flat sheet steel.

13. A piston for a brake caliper of a vehicle disk brake, which is formed in a forming process from a metallic material, the piston having a form of an integral pot which is open on one side and has a longitudinal axis, a wall and a piston crown, and which in a region of the piston crown can be applied with an axial contact surface to a brake pad, wherein an insert with a cone is fixed in an interior of the piston, wherein the insert forms a bearing for a bush, wherein the insert comprises at least three cams formed at an axial end of the insert opposite the piston crown, the at least three cams separated from one another by a circumferential space,
    wherein the cams, support and a twist-prevention means are each arranged on a periphery and placed twisted at an angle relative to each other,
    wherein a piston collar at least partially forms a support for the bush,
    wherein a collar-side end of the bush sits directly on the support and the collar-side end of the bush has a profiling, and
    wherein the collar-side end of the bush has at least two cut-outs which serve as a passage for the twist-prevention means of the piston collar.

14. The piston as claimed in claim 13, wherein both ends of the bush have the profiling and the cut-outs to allow simplified piston mounting.

15. A piston for a brake caliper of a vehicle disk brake, which is formed in a forming process from a metallic material, the piston having a form of an integral pot which is open on one side and has a longitudinal axis, a wall and a piston crown, and which in a region of the piston crown can be applied with an axial contact surface to a brake pad, wherein an insert with a cone is fixed in an interior of the piston,
    wherein the insert forms a bearing for a bush,
    wherein the insert comprises at least three cams formed at an axial end of the insert opposite the piston crown, the at least three cams separated from one another by a circumferential space, and wherein a split of the bush has a split joint which is arranged in a region of a support of a collar of the piston collar.

16. A piston for a brake caliper of a vehicle disk brake, which is formed in a forming process from a metallic material, the piston having a form of an integral pot which is open on one side and has a longitudinal axis, a wall and a piston crown, and which in a region of the piston crown can be applied with an axial contact surface to a brake pad, wherein an insert with a cone is fixed in an interior of the piston, wherein the insert forms a bearing for a bush, wherein the insert comprises at least three cams formed at an axial end of the insert opposite the piston crown, the at least three cams separated from one another by a circumferential space, and wherein a collar-side end of the bush has at least two cut-outs which serve as a passage for a twist-prevention means of the piston collar.

\* \* \* \* \*